(12) United States Patent
Griffioen (10) Patent No.: US 6,722,636 B2
(45) Date of Patent: Apr. 20, 2004

(54) METHOD FOR INSTALLING OPTICAL FIBERS OR CABLES IN A TUBE USING A FLUID UNDER PRESSURE

(75) Inventor: Willem Griffioen, Xj Ter Aar (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 10/148,462

(22) PCT Filed: Dec. 4, 2000

(86) PCT No.: PCT/EP00/12219

§ 371 (c)(1),
(2), (4) Date: Aug. 12, 2002

(87) PCT Pub. No.: WO01/46735

PCT Pub. Date: Jun. 28, 2001

(65) Prior Publication Data

US 2003/0020055 A1 Jan. 30, 2003

(30) Foreign Application Priority Data

Dec. 21, 1999 (NL) .............................................. 1013901

(51) Int. Cl.⁷ .................................................. B66F 3/24
(52) U.S. Cl. .................................................. 254/134.4
(58) Field of Search .................. 254/1, 134.4, 134.3 R, 254/134.3 FT; 15/109.06 R (56) References Cited

U.S. PATENT DOCUMENTS 4,691,896 A   9/1987   Reeve et al.

FOREIGN PATENT DOCUMENTS

| EP | 0 287 225 A1 | 10/1988 |
| EP | 0 292 037 A1 | 11/1988 |
| EP | 0 318 280 A1 | 5/1989 |
| EP | 0 475 815 A1 | 3/1992 |
| EP | 0 508 016 A1 | 10/1992 |
| EP | 0 785 387 A1 | 7/1997 |

OTHER PUBLICATIONS

Patent Abstracts of Japan; vol. 015, No. 139 (E–1053); Apr. 9, 1991; and JP 03 018206 A (Sumitomo Electric Ind. Ltd.) Jan. 25, 1991.

*Primary Examiner*—Robert C. Watson
(74) *Attorney, Agent, or Firm*—Frishauf, Holtz, Goodman & Chick, P.C.

(57) ABSTRACT

Method for, using a fluid under pressure, installing optical fibers or cables in a tubular section comprising a supply tube and an intallation tube, each having an input and an output, the output of the supply tube being in connection with the input of the installation tube, a fluid under pressure being fed near the input of the supply tube, and the cable being conducted into the input of the supply tube and being propelled through the tubular section by the entraining force of the fluid, at least part of the fluid being discharged from the supply tube at the output of the supply tube and, at the input of the installation tube, a second fluid under pressure being fed. Due to said measures, the pressure drop at the input of the tubular section may be overcome without utilizing mechanical means which might damage the fiber or cable.

54 Claims, 3 Drawing Sheets

METHOD FOR INSTALLING OPTICAL FIBERS OR CABLES IN A TUBE USING A FLUID UNDER PRESSURE

This application is a U.S. National Phase Application under 35 USC 371 of International Application PCT/EP00/12219 filed Dec. 4, 2000.

The invention relates to a method for installing optical fibres or cables, using a fluid under pressure, in a tubular section comprising a supply tube and an installation tube, each having an input and an output, the output of the supply tube being connected to the input of the installation tube, a fluid under pressure being fed near the input of the supply tube, and the cable being conducted into the input of the supply tube, and being propelled through the tubular section by the entraining force of the fluid.

Such a method is disclosed, e.g., in EP-A-0 108 590. In this method, an optical cable is conducted into the tube by way of mechanical force, particularly by way of a pair of pressure rolls. To prevent loss of pressure, the input of the tube or of the device is provided, by way of pressure rolls, with a sealing preventing the escape of fluid along the cable or fibre. The pressure rolls serve to overcome the pressure difference between the environment and the space where the fluid pressure is prevailing upon introduction of the cable. In EP-A-0 292 037, a similar method is disclosed, the pressure rolls exercising a force on the cable which exceeds the one required to overcome the pressure difference. With the additional pushing power, a greater installation length may be achieved than with only the entraining force of a fluid, particularly in the event of thicker cables.

For overcoming the force required to introduce the cable into the space where the fluid pressure is present, it is also known to make use of a fluid flowing with increased velocity over a first part, viewed from the input, of the tube length. Exercising mechanical forces, such as in the event of thin or vulnerable fibres or cables, is undesirable on account of the possibility of mechanical damage.

In EP-A-0 345 043 it is disclosed to feed the pressure to the leg of a T-shaped coupling piece, the ongoing portion of the T receiving the cable at one end, and at the other end being connected to a supply tube extending over a relatively modest length, e.g., 1 m, into the installation tube and having a diameter which is 0.1 to 0.8 times the one of [sic] the diameter of the installation tube. In the narrow supply tube, the velocity of the fluid flow is a great deal higher than in the installation tube, as a result of which the required tensile force is generated. A drawback of said solution is that a relatively large portion of the total pressure difference between the input and the output of the installation tube acts on the narrow supply tube, so that either the presssure must be chosen very high for sufficient residual pressure to remain for the actual installation, or the installation length is restricted. The first case often encounters practical, safety and cost problems, and the second is always undesirable, unless the installation is effected over a modest length only.

In EP-A-0 287 225 a method is disclosed, an additional flow rate of the fluid over an initial portion of the installation tube being realised as well. Here, the diameter of the installation tube is the same as the one of the supply tube, and the latter is in fact part of the installation tube. The additional fluid flow is realised by, at the end of the supply tube, where it changes into the installation tube, blowing off part of the fluid by way of an adjustable valve. Said solution has the problem that the velocity of the fluid in the supply tube soon achieves the velocity of sound. In the event of air as a fluid, and a supply tube having a length of several meters, such may already be the case. When achieving the velocity of sound, the energy of the fluid is no longer converted into entraining forces on the cable but into acceleration of the fluid itself.

An additional problem, larger in practise, is that a relatively thin cable in a relatively wide supply tube with respect to said cable, in the event of a high fluid velocity will soon start to twist, so-called buckling, as a result of which the cable will prematurely stick in the tube and can no longer be propelled by the fluid. In the event of narrow supply tubes, such drawback does not exist, but the drawbacks mentioned earlier do.

The object of the invention is to provide for a method enabling the installation of an optical fibre or cable using a fluid, a fluid flow also being applicable for overcoming the pressure difference between the space outside the installation tube and the inside thereof, the fluid flow, over a first portion of the tubular section, having a higher velocity than over the remaining portion of the installation section, without the problems described above occurring.

For this purpose, the invention provides for a method of the aforementioned kind, characterised in that, at the output of the supply tube, at least part of the fluid from the supply tube is discharged, and that, at the input of the installation tube, a second fluid is fed under pressure.

The invention also provides for a device for, using a fluid under pressure, installing optical fibres or cables in a tubular section comprising a supply tube and an installation tube, each having an input and an output, the output of the supply tube being in connection with the input of the installation tube, means being provided for, near the input of the supply tube, feeding a fluid under pressure, and for means to conduct the cable into the input of the supply tube, the cable being propelled through the tubular section by the entraining force of the fluid, characterised in that, at the output of the supply tube, means are provided to discharge at least part of the fluid from the supply tube, and that means are provided for feeding, at the input of the installation tube, a second fluid under pressure.

Essentially, the fluid is preferably completely discharged from the supply tube. In addition, the fluids for the supply tube and the output tube preferably come from one and the same source.

Below, the invention will be explained in more detail on the basis of exemplary embodiments with reference to the drawing. Therein.

In the figures, corresponding parts are designated by the same reference numeral, preceded by the number of the figure, possibly completed by a zero.

Furthermore, the following notation is used in the description of the figure:
$D_c$=cable diameter;
$D_d$=internal diameter of the installation tube;
$D_p$=internal diameter of the supply tube;
$l_p$=length of the supply tube;
$l_d$=length of the installation tube.

Figure 1:
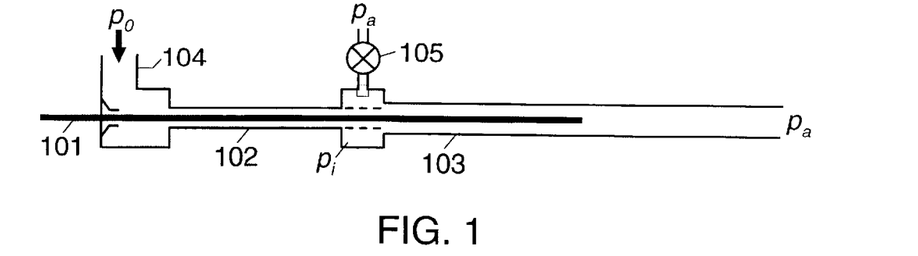
FIG. 1 shows a schematic view of an installation for, using a fluid under pressure, installing a cable into a tube according to a first prior art.

FIG. 1 shows an installation for introducing a cable 101 by way of a supply tube 102 into an installation tube 103. By way of a connection 104, a fluid, e.g., air, is fed under pressure. Part of said fluid is blown off at the end of the supply tube 102 by way of a valve 105. An installation of this type is described in EP-A-0 287-225. In the event of said installation, the diameter of the supply tube is the same as the one of the installation tube. Below, it will be investigated to what extent the ratio of said two diameters affects the installation process.

EP-A-0 108 950 describes that, if a cable having a diameter of $D_c$ is blown into a tube having a diameter of $D_d$, the total blowing force of $F_b$ at a pressure difference of $\Delta p$ is given by:

$$F_b = \frac{\pi}{4} D_d D_c \Delta p \qquad (1)$$

The hydrostatic force $F_{hs}$ which must be overcome to introduce the cable into the pressure space over a pressure drop of $\Delta p$ then is:

$$F_{hs} = \frac{\pi}{4} D_c^2 \Delta p \qquad (2)$$

From (1), (2) and FIG. 1, for a pressure of $p_0$ at the input side near connection 104, an atmospheric pressure $p_a$ at the output of the installation tube, and beyond the valve 105, and an intermediate pressure at the location of the valve 105, which is set to Pi, it may be derived that the hydrostatic force $F_{hs}$ in the supply tube 102 having a diameter of $D_p$ is precisely cancelled out if:

$$\frac{\pi}{4} D_c D_p (p_0 - p_i) = \frac{\pi}{4} D_c^2 (p_0 - p_a) \qquad (3)$$

or:

$$p_i = \frac{(D_p - D_c) p_0 + D_c p_a}{D_p}$$

A supply tube which is relatively narrow with respect to the cable diameter of $D_c$ gives a relatively high flow velocity, and therefore a relatively large pressure drop over a short piece of tube is feasible, provided the velocity remains sufficiently below the velocity of sound, without air needing to be discharged by way of valve 105. A large portion of the pressure, however, is "consumed" to overcome the hydrostatic pressure.

Example: A cable having a diameter of $D_c$=3 mm must be blown into a tube having a diameter of $D_d$=5.5 mm. A supply tube having a diameter of $D_p$=4 mm makes a pressure of $p_0$ drop from 10 bar (absolute) to a $p_i$ of only 3.25 bar.

Figure 2:
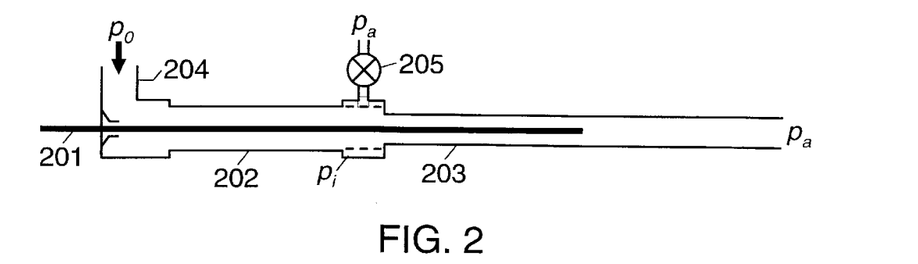
FIG. 2 shows a schematic view of an installation for, using a fluid under pressure, installing a cable into a tube according to a second prior art.

In order to retain a good deal of the pressure to blow into the cable, it is precisely a wider supply tube which is desired, as is shown in FIG. 2. Now, partially blowing off the fluid is certainly required to develop sufficient entraining forces over a short length. If, e.g., a diameter of $D_p$=15 mm is chosen, an amply sufficient pressure of $p_i$=8.2 bar will remain to blow into the cable. Here, however, the problems described above with respect to buckling and exceeding the velocity of sound by the flowing fluid do arise.

Figure 3:
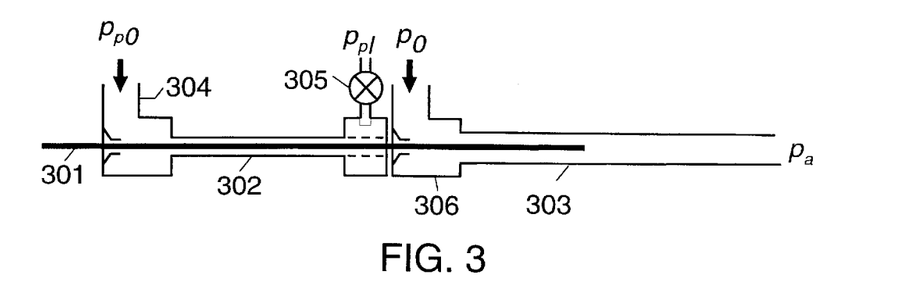
FIG. 3 shows a schematic view of an installation for, using a fluid under pressure, installing a cable into a tube according to a first aspect of the invention.

From (1), (2) and FIG. 3, which shows an exemplary embodiment according to the invention, a separate fluid under pressure being fed to the installation tube by way of the input of an engaging piece 306 which is coupled to the installation tube 303, it may now be derived that the pressure drop in the supply tube 302 is precisely cancelled out if:

$$\frac{\pi}{4}(D_c D_p - D_c^2)(p_{p0} - p_{p1}) = \frac{\pi}{4} D_c^2 (p_o - p_a) \qquad (4)$$

or:

$$D_p = \frac{p_{p0} + p_0 - p_{p1} - p_a}{p_{p0} - p_{p1}} D_c$$

where:
$p_{p0}$=the pressure at the input of the supply tube,
$p_{p1}$=the pressure of the discharge opening of the supply tube.

The net pushing force $F_{push}$ of the "flow motor", i.e., the supply tube, then is:

$$F_{push} = \frac{\pi}{4}(D_c D_p - D_c^2)(p_{p0} - p_{p1}) \qquad (4a)$$

For $p_{p0}$=$p_0$ and $p_{p1}$=$p_a$, equation (4) becomes:

$$D_p = 2D_c \qquad (4b)$$

Figure 4:
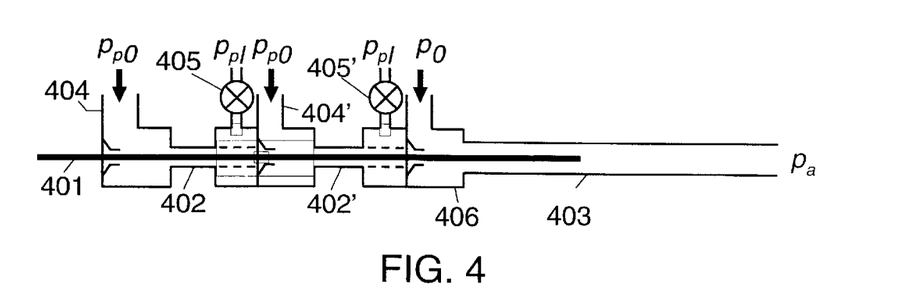
FIG. 4 shows a schematic view of an installation for, using a fluid under pressure, installing a cable into a tube according to a second aspect of the invention.

In the event of a diameter of the supply tube 302 which is twice as large as the one of the cable 301, the complete pressure therefore still being available for blowing in. If for the supply tube a larger pressure is used than for blowing in, the diameter of the supply tube may be reduced still further. This may also, as is shown in FIG. 4, be achieved by applying several supply tubes 402, 402' in cascade, there being completely blown off, by way of valves 405, 405', at the end of each supply tube.

For n cascaded supply tubes, there may be derived a more general version of formula 4 for the internal diameter $D_p$ of the supply tubes. Said more general formula reads:

$$D_p = \frac{p_{p0} + p_0/n - p_{p1} - p_a/n}{p_{p0} - p_{p1}} D_c \qquad (4')$$

For the diameter of the supply tubes, it applies more in general that $D_p$=(1+1/n) $D_c$.

The problems occurring in the installation methods described with reference to FIGS. 1 and 2 may therefore be overcome with the method according to the invention by a suitable dimensioning of the supply tube.

A further advantage obtained by the invention is that it is possible to work with different fluids, since the supply tube is disconnected from the installation tube. There may therefore be applied a fluid having a higher viscosity in the supply tube. As a result, the flow rate in the supply tube may be restricted still further and in addition very short lengths may be achieved, as a result of which the probability of buckling may in fact be excluded.

An example of a fluid for application in the supply tube is hydraulic liquid. If the sealing between the supply tube and the pressure space in the engaging piece 306 or 406, which is coupled to the tube to be installed, is not complete, then part of the fluid from the supply tube may be introduced together with the cable. In this case, the liquid for the supply tube must be compatible with cable and tube material and, in addition, not adversely affect the friction coefficient between cable and tube. A safer fluid for the supply tube is water or, better still, a lubricant. This may be the same lubricant as the one used when installing the cable. In this manner, the lubricant may even be applied beautifully evenly. If it is undesirable that fluid comes from the supply tube into the installation tube, the cable may be wiped clean in the space between the supply tube and said pressure space.

Figure 5:
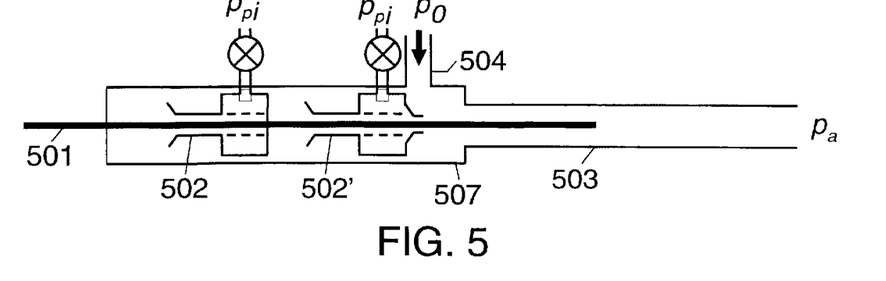
FIG. 5 shows a schematic view of an installation for, using a fluid under pressure, installing a cable into a tube according to a third aspect of the invention.

FIG. 5 shows a special embodiment. Here, the supply tubes 502, 502' are placed inside a engaging piece 507. Such is particularly advantageous if there are cascaded engaging pieces, and the fluid may be directly obtained from the pressure space within the engaging piece.

Figure 6:
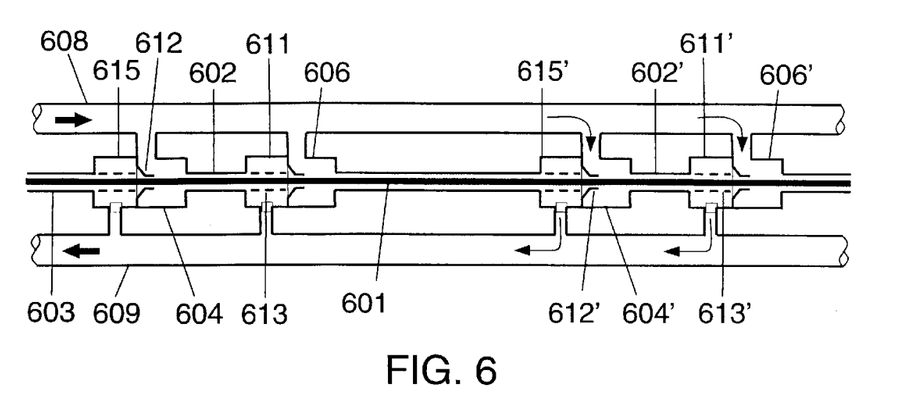
FIG. 6 shows a schematic view of an installation for, using a fluid under pressure, installing a cable into a tube according to a fourth aspect of the invention.

It is also feasible to apply several cascaded loose supply tubes 602, 602', distributed over a section, such as is shown in FIG. 6. Said supply tubes each deliver a slight pushing force and operate as "flow motors". If there are many in a row, in this way an even distribution of the pushing forces may be achieved. Flow in the tube between the "flow motors" is still present, but not critical. It is therefore also possible to use narrow installation tubes. The feed and discharge of both the "flow motors" and the installation tubes may be taken care of through tubes 608 and 609 which lie along the installation tubes 603. Said feed and discharge tubes may have a larger diameter than the installation tube, so that a small pressure drop may be achieved over the first-mentioned tubes. In addition, various installation tubes may be operated from the tubes 608 and 609. A reduction of the dimensions of a bundle of installation tubes may be effectively realised in this manner.

FIG. 6 shows a cable 601 being installed in a tube 603. Several "flow motors" are cascaded to effect the propulsion of the cable 601. The heart of a flow motor is the supply tube 602, 602'. In such tube, a fluid flows with a velocity in excess of the one of cable 601. The fluid is fed by way of a tube 608 and discharged by way of a tube 609. The engaging piece 604 forms the connection between feed tube 608 and supply tube 602. The disconnecting piece 611 forms the connection between supply tube 602 and discharge tube 609. In the coupling pieces 604 and 611, bulkheads 612 and 613 respectively, provide for the cable 601 not being pressed too much against the wall. For the installation tube 603, engaging pieces 606, 606' and disconnecting pieces 615, 615' are used, which have their input and discharge from and into, respectively, the tubes 608 and 609.

The application with cascaded "flow motors" particularly offers advantages if a cable already runs through said "motors". If the cable is still to be introduced, each time upon entering into the supply tube a counterforce for overcoming the pressure drop will be experienced. This is compensated only if the cable has penetrated far enough into the supply tube. There are solutions, however, to this problem:

Making use of a previously installed pulling rope.

Providing the supply tube with a venturi, such as in EP-A-0 318 280, (see the description of FIG. 8 below) or of an input piece generating a so-called coanda spiral flow, as is described in EP-A-0 508 016.

Applying a supply tube having a great discharge leak, in such a manner that there is hardly any pressure built up, and the cable may therefore enter easily. Only at the end of the supply tube, the leak is plugged by the cable blocking the leak (see the description following below of FIG. 7).

Figure 7:
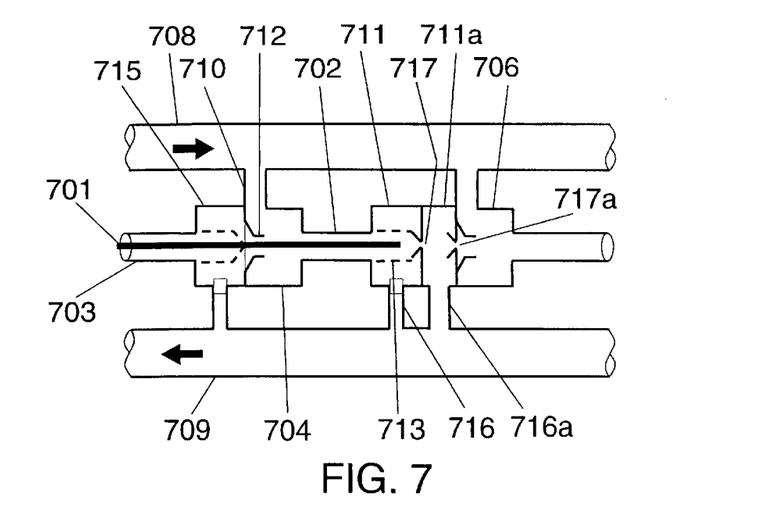
FIG. 7 shows a schematic view of an installation for, using a fluid under pressure, installing a cable into a tube according to a fifth aspect of the invention.

FIG. 7 shows a cable 701 being installed in a tube 703. Only one of the "flow motors", with which the propulsion of the cable 701 is realised, is shown. The heart of a flow motor once again is the supply tube 702 having a fluid therein flowing with a velocity in excess of the one of cable 701. The fluid is fed by way of tube 708 and discharged by way of tube 709. The connection 710 to the engaging piece 704 now is a somewhat narrower tube. The dimensions are such that "in operation" (see later) the flowing fluid may achieve sufficient velocity to exercise sufficient propelling force onto the cable. Initially, the discharge flow, by way of the supply tube 702, is the disconnecting piece 711a, through which the larger part of the medium flows, and a tube 716a, which forms a connection between the disconnecting piece 711a and the discharge tube 709, is so large that by way of the narrow tube 710 there is hardly built up any pressure in connecting piece 704. The cable 701 may then easily be conducted into the flow motor. While filling the supply tube 702 with cable 701, the pressure already starts to increase somewhat, but the cable 701 also receives an entraining force over an ever larger length. Once it has arrived at the opening 717, between the disconnecting pieces 711 and 711a, the pressure suddenly becomes even higher. After all, the cable 701 fits essentially precisely into the opening 717, so that the flow towards disconnecting piece 711a is now blocked. The discharge flow now runs by way of disconnecting piece 711 and by way of a narrower tube 716. Now, the situation has been achieved that the "flow motor" works normally. In the connecting pieces 704 and 711, bulkheads 712 and 713, respectively, once again provide for the cable 701 not being pressed too hard against the wall. For the feed and the discharge, respectively, of the fluid towards or from the installation tube, engaging piece 706 and disconnecting piece 715 are used, which have their feed and discharge in the same tubes 708 and 709.

Figure 8:
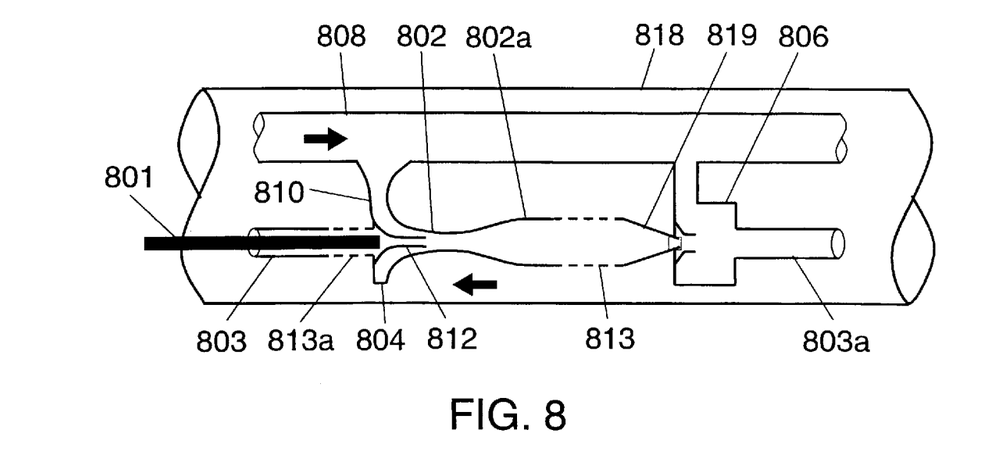
FIG. 8 shows a schematic view of an installation for, using a fluid under pressure, installing a cable into a tube according to a sixth aspect of the invention.

FIG. 8 shows a cable 801 which is installed in a tube 803 and furthermore in a tube 803a. One of the "flow motors" is shown, with which the propulsion of the cable 801 is realised. The heart of a flow motor once again is the supply tube 802/802a, in which a fluid is flowing having a velocity larger than the one of the cable 801. The fluid is again fed by way of tube 808. By way of connecting tube 810, which has such a course that no turbulence causing an additional flow resistance occurs, the fluid is introduced into the coupling piece 804. Here, the fluid is conducted evenly into a supply tube 802 designed as a venturi. The diameter of tube 802 is much smaller than the one of tube 808, namely, so much smaller that the velocity of the fluid increases so much that the pressure becomes so much lower (according to Bernoulli) that it effectively becomes about equal to the one at the end of tube 803. There is then no longer any pressure drop at the point where the cable 801 enters the coupling piece 804. Upon the input, the cable 801 is shielded, by the shielding bulkhead 812, from fast-flowing fluid in the transverse direction. In the supply tube 802, the heart of the venturi, an entraining force is exercised on the cable 801. The same also occurs in the conically broadening part 802a of the supply tube. In tube portion 802a, the velocity of the fluid is once again gradually reduced, and simultaneously the pressure increases again. The dimensioning should be such that the cable 801, when running through tube portion 802a, has built up sufficient entraining forces to be capable of compensating at any rate the pressure drop at the input in the coupling piece 804. This may be determined, e.g., by simulation or by trial and error. At the bulkheads 813 of the "disconnecting piece" of the supply tube, the fluid is discharged once again. The net pushing power of the "flow motor" is the built-up entraining force in tube portions 802 and 802a, and in the "disconnecting piece" having bulkheads 813. It is possible to have the bulkheads 813 run straight over a more extended section, before the fluid is discharged. The discharge of the fluid is now directly outwards, however, within a protection tube 818. The protection tube 818 in this case serves as a return channel. The cable 801 is conducted through a conic end 819 of the "disconnecting piece" having bulkheads 813 into the continuation piece 803a of the installation tube 803. The conic end 819, after passing through of cable 801, may form a close sealing between the "flow motor" and tube 803a. For the installation tube, coupling piece 806 is used, which obtains its feed from the tube 808. The installation tube has its discharge to protection tube 818 by way of a same type of bulkhead 813a as at the disconnecting piece of the supply tube.

EXAMPLE 1

A small cable having a diameter $D_c$ of 3 mm, a weight W of 0.1N/m and a rigidity B of 0.01 $Nm^2$ is installed in a tube having a diameter $D_d$ of 4 mm and having a change [sic] coefficient f=0.2 between tube and cable. Blowing in with a pressure of 10 bar (absolute) and an additional pushing force of 10 N is possible over a distance of 518 m (standard section, each time having a right-angle curve after 200 m). With water as a fluid, a length of 1078 m may be attained. Without additional pushing, a length of 1005 m is still attained. When, however, the force for overcoming the pressure drop at the cable input is not compensated, said length decreases strongly.

For the embodiment according to FIG. 1, in the event of equal $D_p$ and $D_d$ in the supply tube, a large part of the available pressure is required to compensate the input force. This is why a much larger $D_p$=15 mm must be chosen. From (3), there then follows a $p_i$=8.2 bar.

If, for said geometry, air is applied as a fluid, at a length of the supply tube which is restricted to several meters, the velocity of sound is exceeded. The energy of the air flow in that case is dissipated by a shock wave, and not by the entraining effect on the small cable. Therefore, a liquid must be applied, e.g., water. The velocity of the liquid is limited to several dozens of meters per second and the volume flow to several liters per second.

The drawback of a supply tube having a large diameter—cable buckling—is still present. With the embodiment according to FIG. 3, said problem is solved and with the one according to FIG. 4, still better. From formula 4, upon equal input and output pressure at the supply tube and the installation tube, there follows a diameter DP for the 6 mm supply tube.

For the embodiment of FIG. 3, air may once again be used in the installation tube. In addition, larger diameters are then feasible for the installation tube, the supply tube simply remaining equal. With the embodiment according to FIG. 1, such is definitely unthinkable.

EXAMPLE 1a

Fibres are blown into installation tubes (guide tubes) having the same dimensioning as in Example 1, which tubes are installed as a bundle in a protection tube. Blowing refers to 518 m per unit. To attain 2 km, therefore, 4 units in cascade are required (instead of two units, as in FIG. 4). Said units may be fed using a separate feed tube, while the output is possible either separately, as in FIG. 7, or through the protection tube (as in FIG. 8, but not necessarily with a tube implemented as a venturi). The diameter of the feed tube must be larger than the one of the installation tubes, such in order to restrict the pressure losses over the feed tubes; for the protection tube, such is already automatically the case. If, e.g., the diameter of the feed tube is just as large as the one of the installation tube, over a feed length of 500 m, up to the first flow motor, for the same flow rate in the installation tube as in Example 1, the entire available pressure would already have been consumed in the feed process. The pressure gradient in the feed tube fortunately decreases rapidly with increasing diameter. In the event of the volume rate remaining equal, the pressure gradient is inversely proportionate to $D_d^{19/4}$, $D_d$ in this case relating to the internal diameter of the feed tube (see Appendix A below). A diameter of 6 mm already suffices and, using a somewhat larger diameter, e.g., of 8 mm, several installation tubes may also be simultaneously excited.

The method described above may be applied using, e.g., the following steps. First lay a protection tube having, e.g., a length of 2 km and a diameter of 50/40 mm (externally/internally). Subsequently blow in a bundle of tubes, consisting of 1 (supply) tube having a diameter of 10/8 mm and 12 (installation) tubes having a diameter of 5/4 mm, using the method as described in EP-A-0 785 387. After installation of the bundle of tubes, the protection tube must be opened, e.g., each 500 m. In the open spots, "flow motors" as shown in FIG. 8 may now be mounted between the installation tubes and be connected to the supply tube. Thereafter, the protection tube is closed again. This may be effected through previously shifted tube pieces having a larger diameter and the required couplings, or using divisible housings which may be placed after the "flow motors". After said actions, the cables may be blown in. It is also feasible, with one feed tube, to feed flow motors which are connected to parallel installation tubes.

EXAMPLE 2

A cable having a diameter $D_c$ of 10 mm is installed into a tube having any diameter through a method according to FIG. 3 (in the installation tube, installation is preferably effected using compressed air having a pressure of about 7–10 bar, as in EP-A-0 292 037). Installation using a liquid, e.g., water, is of course also possible. The supply tube has a diameter $D_p$ of 14 mm. As a result, a lubricant, such as, e.g., Polywater, having a dynamic viscosity p of 2 Pa, is allowed to flow at a pressure $p_{p0}$ of 50 bar. According to (4a), said "flow motor" delivers a force of 154 N, sufficient as a mechanical force when pushing/blowing according to EP-A-0 292 037. At a length $l_p$ of 50 cm, from (5) and (6) there follows a volume flow $\Phi_v$ of 2 l/s and a velocity v of 26 m/s. The liquid, therefore, flows considerably faster than the cable (condition for delivering the entraining force) and a volume flow of 2 l/s may be delivered using conventional pumps. In this situation, the flow is turbulent, as was assumed in the calculations.

In order to prevent a possibly too large generation of heat in the lubricant for said combination of flow rate and pressure difference, it may be necessary to take measures for this purpose, e.g., conducting the flow of Polywater through a cooled heat exchanger before it is returned to the pump. In addition, the volume flow may still be reduced by choosing a narrower supply tube. In such case, it is necessary to cascade various supply tubes in the flow motor. In spite of said cascading, the total of the volume flow becomes smaller with respect to the one at a flow motor having a single supply tube. Including the velocity with which the liquid flows, by the way. This is no objection, however, as long as said velocity remains amply above the velocity of the cable (0.5 to 1 m/s).

EXAMPLE 3

A small cable having a diameter $D_c$ of 3 mm is installed in a tube having any diameter, through a method according to FIG. 5. The supply tubes have a diameter $D_p=3.6$ mm. Water is used as a fluid, both for the supply tube and for the installation tube. The pressure $p_{p0}$ equals 6 bar. According to (4a), one "flow motor" delivers a force of 0.71 N. Compensation of the pressure drop when introducing it into the installation tube (also 6 bar) requires 5 units. To compensate for friction losses, it may make sense to use a sixth supply tube. For a length $l_p=2.5$ cm, from formula (5) and (6) (see Appendix A) there follows a volume flow $\Phi_v=0.09$ l/s per supply tube and a velocity v=29 m/s. The liquid therefore flows considerably faster than the cable, and a volume flow of 0.55 l/s in total may be delivered by a good (domestic) tap. From (6) and (7), there follows a Reynolds number of 38267; the flow therefore being sufficiently turbulent, as was assumed in the calculations.

If the piping must remain dry such as, e.g., upon installation in a building, an embodiment according to FIG. 4 may also be used, (compressed) air being fed to the installation tube. Likewise, flushing with (compressed) air after installation with water, according to FIG. 5, is possible. In either case, however, the solution loses the advantage that no special provisions are required. Still, flushing with air may also be achieved by utilising the pressure of the water mains by way of a buffer vessel, as in FIG. 9.

Figure 9:
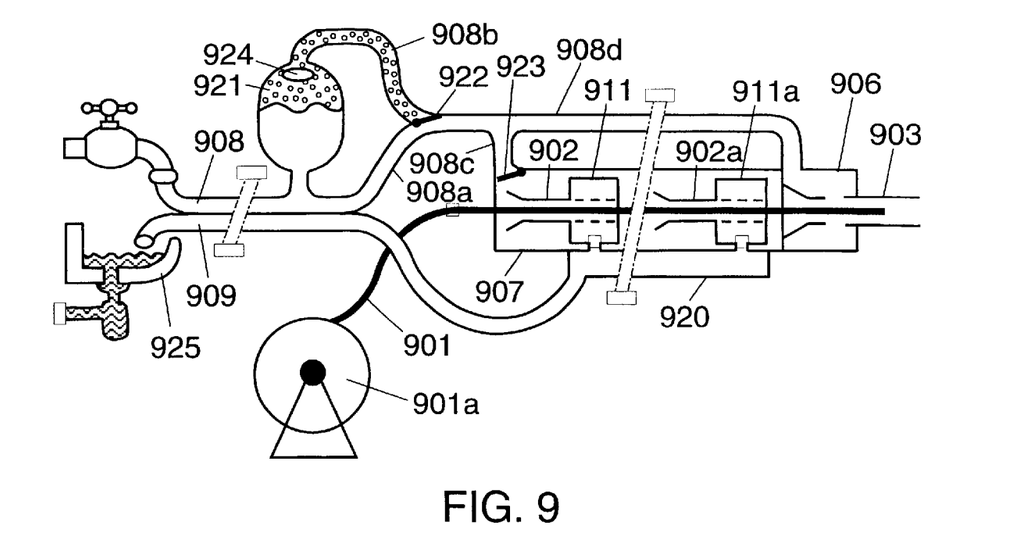
FIG. 9 shows a schematic view of an installation for, using a fluid under pressure, installing a cable into a tube according to example 1 [sic].

FIG. 9 shows an application of Example 3. A cable 901 from a reel 901a is installed in a tube 903 using water. The water is obtained from a tap and is conducted, by way of feed hose 908, to the housing 907 for the flow motors having supply tubes 902 and 902a. The feed hose 908 is split up into 2 paths, 908a and 908b, the latter of which goes by way of a buffer vessel 921. Initially, path 908b is blocked by tap 922. The enclosed air in the buffer vessel will be compressed by the pressure from the tap, as a result of which the water in the buffer vessel 921 will rise to a specific height. Apart from the housing 907 for the flow motors, the water will also feed the coupling piece 906 which, in FIG. 5, is integrated with the housing 507, to the tube 903. The flow motors having supply tubes 902 discharge their water into tube 920, which runs by way of a discharge hose 909 to, e.g., a washbasin 925. The water from tube 903, which is a much smaller amount, may be caught in, e.g., a bucket. Once the cable 901 is installed, there follows a flushing using air. This is effected by now blocking the path 908a with the tap 922 and opening path 908b. The air in the top of the buffer vessel 921, which is at the same pressure as the water, will then take over the role of the water. To prevent the water from escaping into tube 908b, a float 924 is placed in the top of the buffer vessel 921. In order not to "spill" a large part of the limited amount of air enclosed in the flow motors, housing 907 is closed off with a tap 923.

Appendix A

In turbulent regime, the pressure gradient dp/dx follows from Blasius, see (5.15) from W. Griffioen, "Installation of optical cables in ducts", Plumettaz, Bex (CH), 1993. For a tube having a diameter $D_p$, this should be read as:

$$\frac{dp}{dx} = -0.24 \frac{\mu^{1/4} \rho^{3/4}}{D_p^{19/4}} \Phi_v^{7/4} \quad (5)$$

Herein, $\mu$ is the dynamic viscosity ($1.8 \times 10^{-5}$ Pa for air, $1.1 \times 10^{-3}$ Pa for water, and 2 Pa for Polywater), $\rho$ is the density ($1.3 \text{kg/m}^3$ for air, 1000 kg/m³ for water and Polywater) and $\Phi_v$ is the volume flow of the flowing medium. If filled with a cable having a diameter of $D_c$, the term $D_p^{19/4}$ in formula 5 must be replaced by $$D_p^{19/4} \Rightarrow (D_p - D_c)^{5/4} (D_p^2 - D_c^2)^{7/4} \quad (6)$$

The Reynold number Re is defined as:

$$Re = \frac{\rho v D_h}{\mu} \quad (7)$$

where $D_h$ is the hydraulic diameter, in this case equal to $D_p - D_c$.

For a Reynolds number in excess of 2000, the flow becomes turbulent.

What is claimed is:

1. Method for, using a fluid under pressure, installing optical fibres or cables in a tubular section comprising a supply tube and an installation tube, each having an input and an output, the output of the supply tube being in connection with the input of the installation tube, a fluid under pressure being fed near the input of the supply tube, and the cable being conducted into the input of the supply tube and being propelled by the entraining force of the fluid through the tubular section, wherein:

at the output of the supply tube, at any rate part of the fluid is discharged from the supply tube and that, at the input of the installation tube, a second fluid under pressure is fed.

2. Method according to claim 1, wherein the outputs of the supply tube and the installation tube flow out into the same environment.

3. Method according to claim 1, wherein the input of the supply tube and the input of the installation tube are coupled to the same fluid source.

4. Method according to claim 1, wherein the fluid for the supply tube is a gas.

5. Method according to claim 4, wherein the fluid for the supply tube is air.

6. Method according to claim 1, wherein the fluid for the supply tube is a liquid.

7. Method according to claim 6, wherein the fluid for the supply tube is water.

8. Method according to claim 6, wherein the fluid for the supply tube is a hydraulic liquid.

9. Method according to claim 6, wherein the fluid for the supply tube is a lubricant.

10. Method according to claim 6, wherein the fluid for the supply tube is a a gas compressed to the liquid.

11. Method according to claim 1, wherein the pressures on the inputs of the supply tube and the installation tube are equal.

12. Method according to claim 1, wherein the fluid flowing through the installation tube is air.

13. Method according to claim 1, wherein the fluid flowing through the installation tube is water.

14. Method according to claim 1, wherein the fluid flowing through the installation tube is a gas compressed to a liquid.

15. Method according to claim 1, wherein the pressure at the end of the supply tube is greater than, or equal to, the pressure at the start of the installation tube.

16. Device for, using a fluid under pressure, installing optical fibres or cables in a tubular section comprising a supply tube and an installation tube, each having an input and an output, the output of the supply tube being in connection with the input of the installation tube, there being provided for means near the input of the supply tube to feed a fluid under pressure, and for means to conduct the cable into the input of the supply tube, the cable being propelled through the tubular section by the entraining force of the fluid, wherein:

at the output of the supply tube, there is provided for means to discharge at least part of the fluid from the supply tube and there being provided for means to, at the input of the installation tube, feed a second fluid under pressure.

17. Device according to claim 16, wherein the supply tube comprises n cascaded sections.

18. Device according to claim 17, wherein the means to feed a second fluid under pressure to the input of the installation tube comprises n sections.

19. Device according to claim 17, wherein the diameters of the supply tubes are about equal to, or greater than, $$\frac{p_{p0} + p_0 \mid n - p_{pl} - p_a \mid n}{p_{p0} - p_{pl}}$$

times the diameter of the cable.

20. Device according to claim 19, wherein the diameters of the supply tubes are about equal to, or greater than, $(1+1/n)$ times the diameter of the cable.

21. Device according to claim 16, wherein the supply tube or supply tubes are mounted fixedly to the installation tube.

22. Device according to claim 16, wherein the supply tube or supply tubes are located in the inside of the means to, at the input of the installation tube, feed a second fluid under pressure.

23. Device according to claim 22, wherein feeding fluid for the supply tube or supply tubes is directly coupled to the inside of the means to feed a second fluid under pressure to the input of the installation tube.

24. Device according to claim 17, wherein the means to discharge at least part of the fluid from the supply tube and the means to feed a second fluid to the input of the installation tube comprise a discharge tube and a supply tube, respectively, which tubes extend parallel to the installation tube.

25. Device according to claim 24, wherein the discharge tube surrounds the supply tube and the installation tube.

26. Device according to claim 17, wherein the means for, at the input of the installation tube, feeding a second fluid, comprise a feed tube having an internal diameter which is larger than the internal diameter of the installation tube, which feed tube serves for feeding fluid to several supply tubes, which are each connected to one or more parallel installation tubes.

27. Method according to claim 2, wherein the input of the supply tube and the input of the installation tube are coupled to the same fluid source.

28. Method according to claim 27, wherein the fluid for the supply tube is a gas.

29. Method according to claim 2, wherein the fluid for the supply tube is a gas.

30. Method according to claim 3, wherein the fluid for the supply tube is a gas.

31. Method according to claim 27, wherein the fluid for the supply tube is a liquid.

32. Method according to claim 2, wherein the fluid for the supply tube is a liquid.

33. Method according to claim 3, wherein the fluid for the supply tube is a liquid.

34. Method according to claim 27, wherein the pressures on the inputs of the supply tube and the installation tube are equal.

35. Method according to claim 2, wherein the pressures on the inputs of the supply tube and the installation tube are equal.

36. Method according to claim 3, wherein the pressures on the inputs of the supply tube and the installation tube are equal.

37. Method according to claim 27, wherein the fluid flowing through the installation tube is air.

38. Method according to claim 2, wherein the fluid flowing through the installation tube is air.

39. Method according to claim 3, wherein the fluid flowing through the installation tube is air.

40. Method according to claim 27, wherein the fluid flowing through the installation tube is water.

41. Method according to claim 2, wherein the fluid flowing through the installation tube is water.

42. Method according to claim 3, wherein the fluid flowing through the installation tube is water.

43. Method according to claim 27, wherein the fluid flowing through the installation tube is a gas compressed to a liquid.

44. Method according to claim 2, wherein the fluid flowing through the installation tube is a gas compressed to a liquid.

45. Method according to claim 3, wherein the fluid flowing through the installation tube is a gas compressed to a liquid.

46. Method according to claim 27, wherein the pressure at the end of the supply tube is greater than, or equal to, the pressure at the start of the installation tube.

47. Method according to claim 2, wherein the pressure at the end of the supply tube is greater than, or equal to, the pressure at the start of the installation tube.

48. Method according to claim 3, wherein the pressure at the end of the supply tube is greater than, or equal to, the pressure at the start of the installation tube.

49. Device according to claim 18, wherein the diameters of the supply tubes are about equal to, or greater than, $$\frac{p_{p0} + p_0 \mid n - p_{pl} - p_a \mid n}{p_{p0} - p_{pl}}$$

times the diameter of the cable.

50. Device according to claim 49, wherein the diameters of the supply tubes are about equal to, or greater than, $(1+1/n)$ times the diameter of the cable.

51. Device according to claim 17, wherein the supply tube or supply tubes are mounted fixedly to the installation tube.

52. Device according to claim 18, wherein the supply tube or supply tubes are mounted fixedly to the installation tube.

53. Device according to claim 17, wherein the supply tube or supply tubes are located in the inside of the means to, at the input of the installation tube, feed a second fluid under pressure.

54. Device according to claim 18, wherein the supply tube or supply tubes are located in the inside of the means to, at the input of the installation tube, feed a second fluid under pressure.

* * * * *